March 9, 1971    C. H. MAPS ET AL    3,568,321
LOW COST PLOTTER

Filed Sept. 6, 1968    6 Sheets-Sheet 1

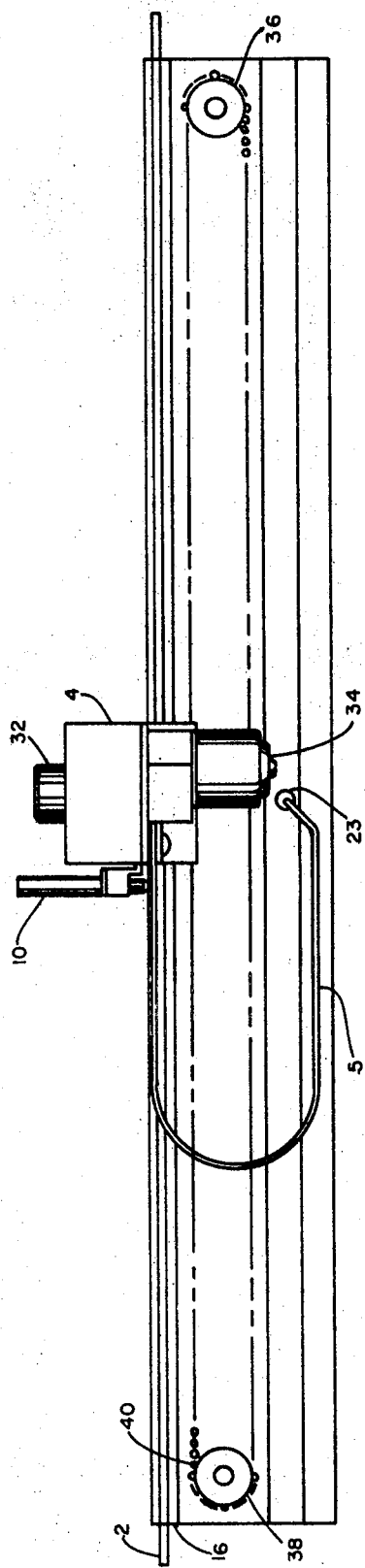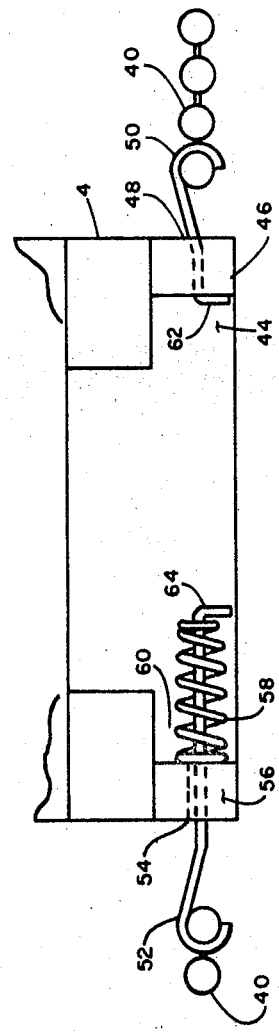

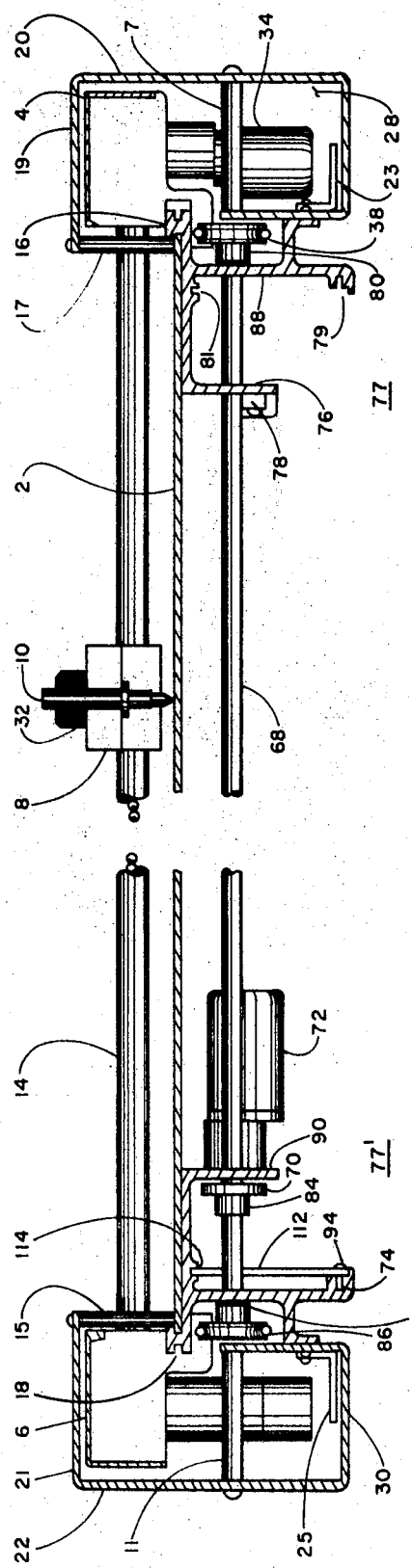
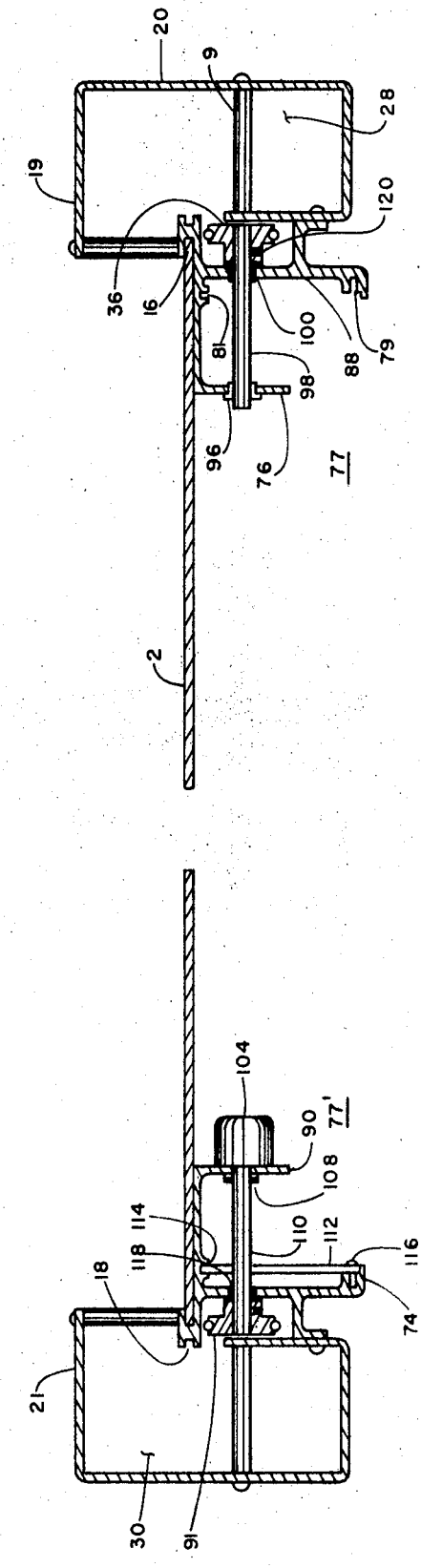
FIGURE 3
FIGURE 4

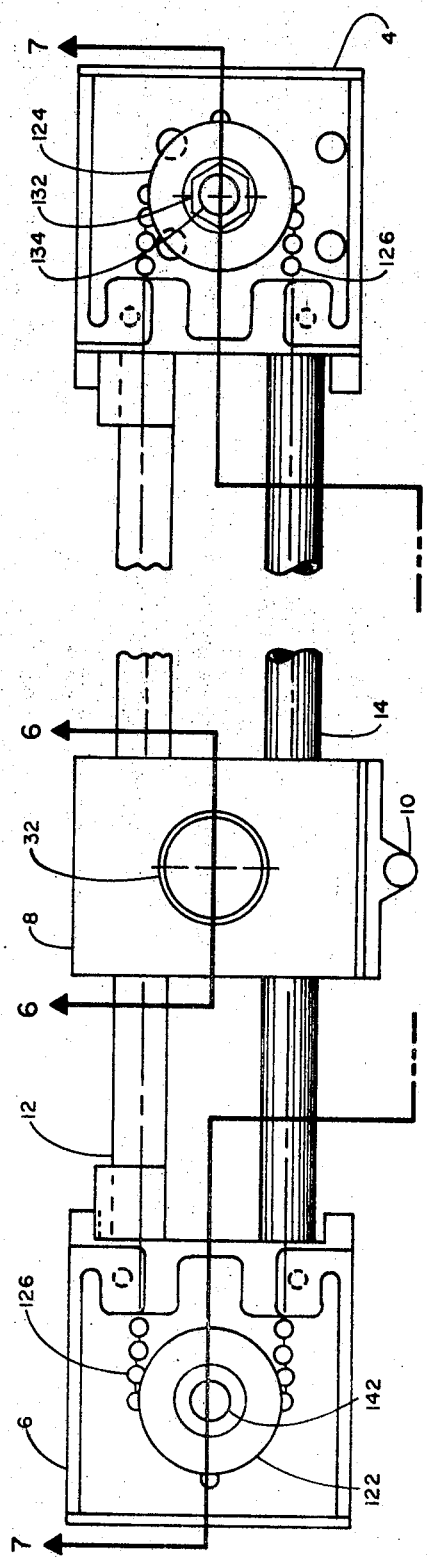
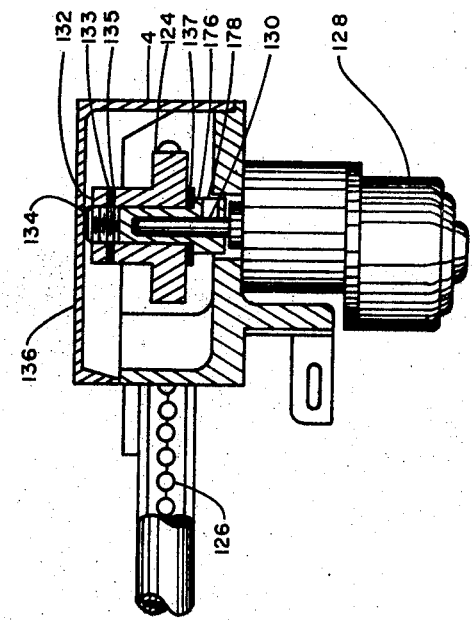
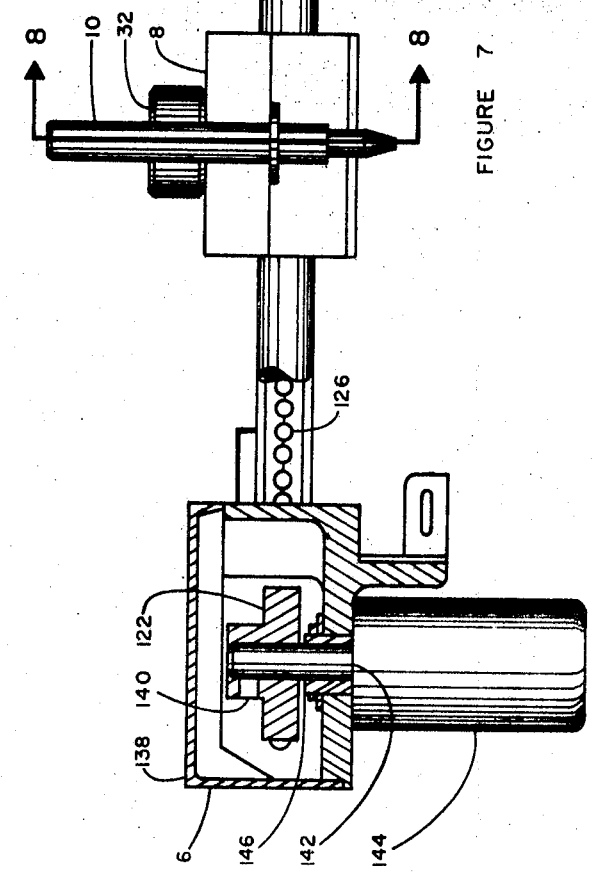
FIGURE 5
FIGURE 7

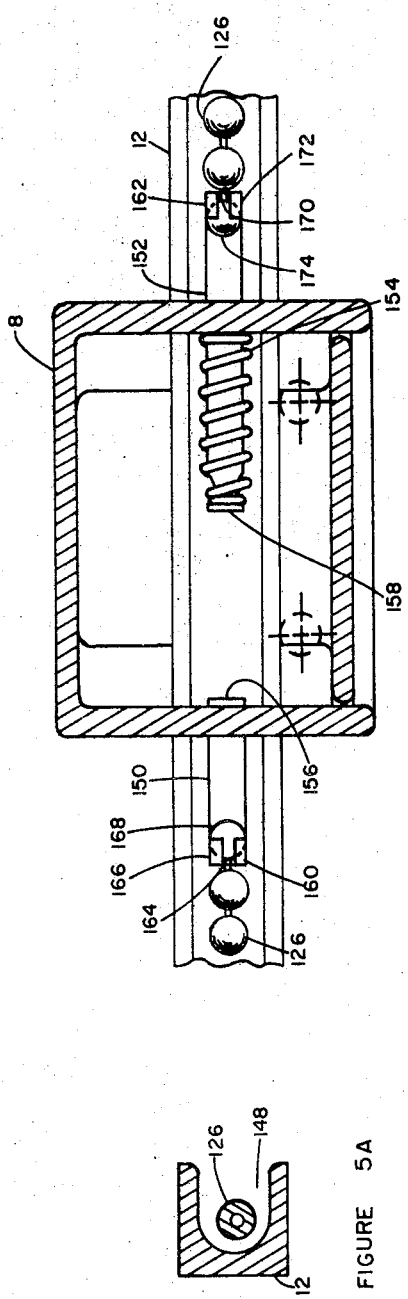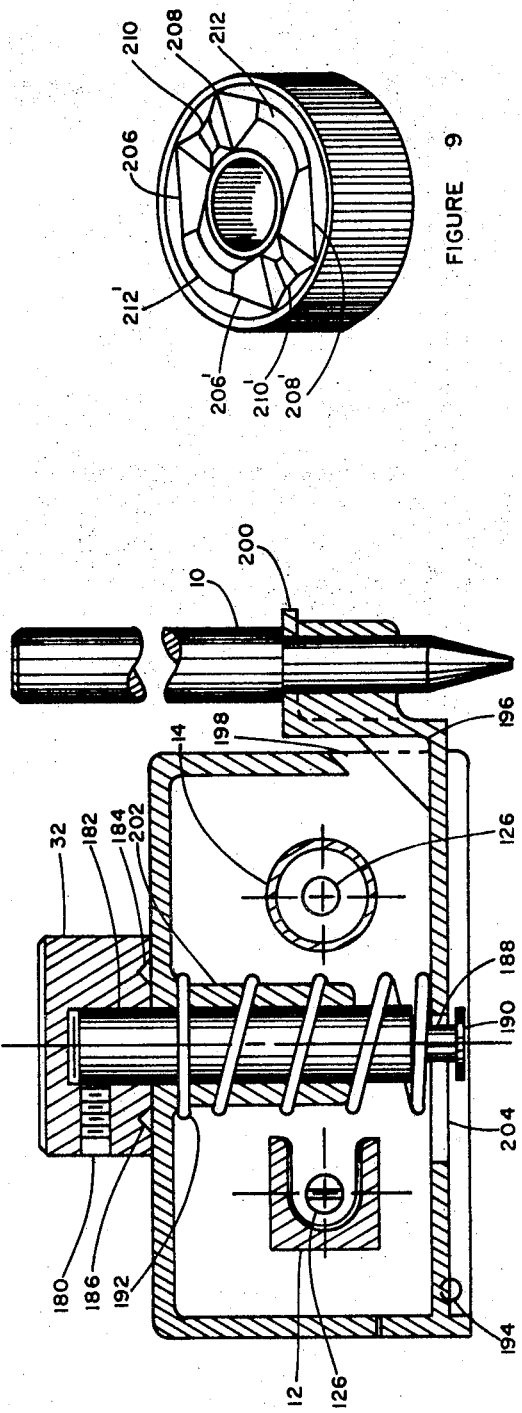

United States Patent Office 3,568,321
Patented Mar. 9, 1971

3,568,321
LOW COST PLOTTER
Charles H. Maps, West Long Branch, and Edward J. Paschetto, Little Silver, N.J., assignors to Electronic Associates, Inc., West Long Branch, N.J.
Filed Sept. 6, 1968, Ser. No. 757,881
Int. Cl. B43l 13/02
U.S. Cl. 33—18                                   1 Claim

ABSTRACT OF THE DISCLOSURE

A low cost plotter having a plotting surface which serves as the main structural support for the plotter, an arm mounted for travel along opposite sides of the plotting surface, a pen holding mechanism mounted for movement along the arm, with the arm being driven at both sides of the surface by a dual bead belt drive to prevent arm skew and to ensure accurate squaring.

---

This invention relates to a plotter and, more particularly, to features of the plotter which enable it to provide considerable accuracy at low cost.

A long-standing problem in the plotter industry has been to build an accurate plotter for sale at low cost. Accuracy in a plotter is largely a function of the mechanical mechanisms needed to position the plotting arm along the plotting surface and to position the pen along the plotting arm. In general it may be said that the costs of these mechanisms determines the price of the plotter.

The present invention represents a new approach to the design and fabrication of these mechanisms enabling lower over-all manufacturing and retail costs.

The main feature of the present invention resides in the dual drive mechanism which is operable to drive, from a single motor, both ends of the plotting arm across the plotting surface in precise synchronism so that the possibility of skew between the ends of the plotter arm is eliminated.

Another feature of the present invention resides in the use of a drive mechanism, similar to that used to drive the plotter arm, to drive the pen along the arm. This mechanism employs a double support for the pen carriage on the plotter arm and a continuous driving element for the pen carriage coupled from one side of the pen carriage to the other via driving and detection mechanisms at both ends of the plotter arm.

It is, therefore, an object of the present invention to provide a low cost plotter.

A further object is the provision of a low cost plotter retaining precision and accuracy comparable to higher cost plotters.

Another object of the present invention is the provision of unique plotter arm and pen carriage drive mechanisms enabling considerable cost reduction.

These, as well as other objects of the invention, will become further apparent from a reading of the following specification in conjunction with the drawings in which:

FIG. 2 is a side view of the plotter in accordance with the invention;

FIG. 2A is an enlarged partial view inside arm block 4;

FIG. 3 is an end view of the plotter;

FIG. 4 is a section view taken along the line 4—4 of FIG. 1;

FIG. 5 is a plan view of the plotter arm assembly;

FIG. 5A shows a detailed section of the channel member 12;

FIG. 6 is a section view of the pen carriage hookup taken along the line 6—6 of FIG. 5;

FIG. 7 is a side view partially in section, of the plotter arm assembly taken along the line 7—7 of FIG. 5;

FIG. 8 is a section view of the pen carriage taken along the line 8—8 of FIG. 7;

FIG. 9 is an isometric view of the pen lift knob; and

BRIEF DESCRIPTION

The plotter of the present invention employs a dual bead belt drive at both sides of the plotting surface for the plotter arm, and a similar single bead belt drive in the plotter arm to drive the pen carriage. Identical, matched electrical circuitry is used to drive both the plotter arm and the pen carriage. Simple pen lift structure is employed to provide positive pen control engagement at low cost. Accuracy of position is ensured by the dual bead belt drive for the plotter arm and the single bead belt drive for the pen carriage.

Figure 1:
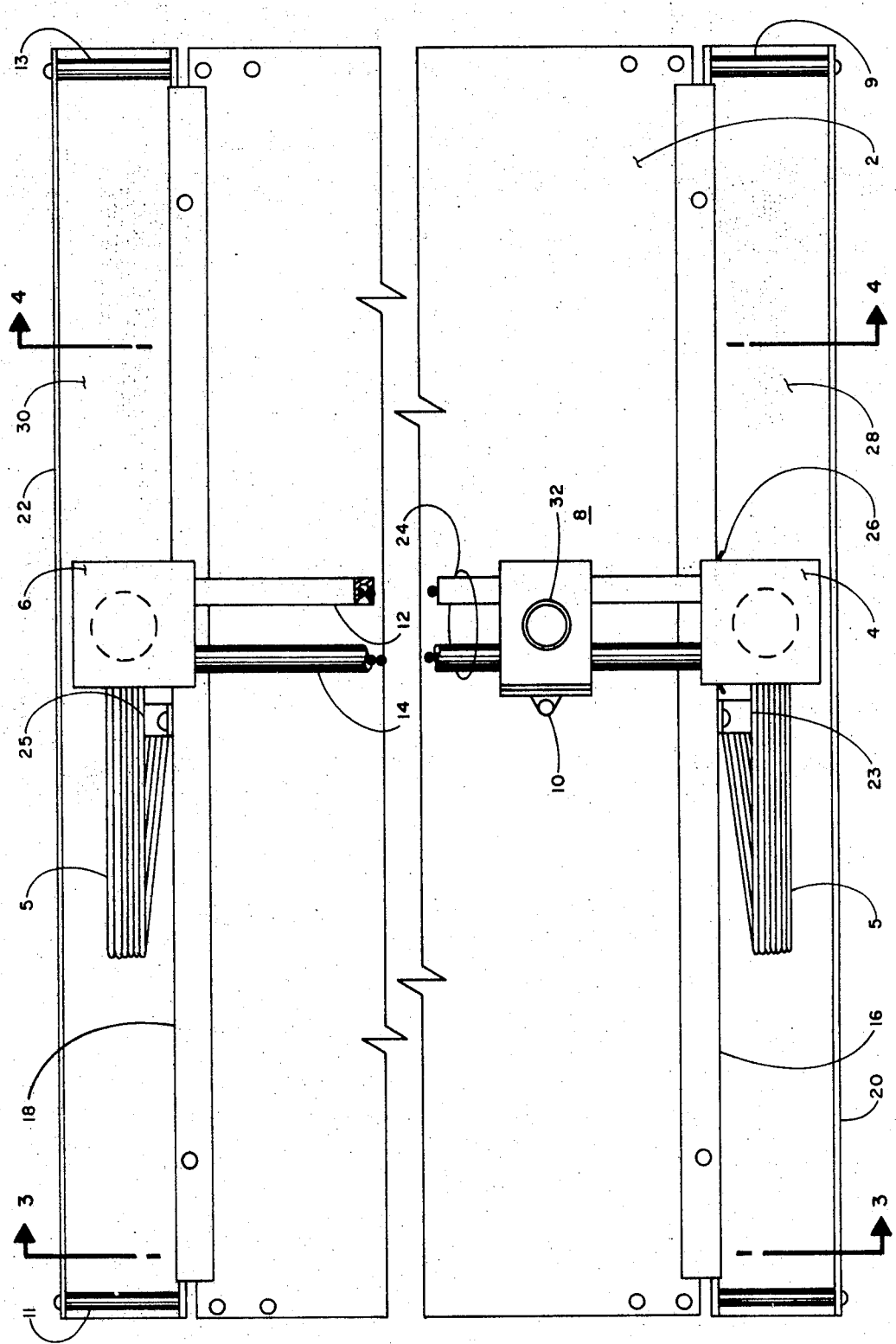
FIG. 1 is a plan view of the top of the plotter according to the invention.

In FIG. 1, numeral 2 denotes the plotting surface which is constructed of a durable strong metal such as aluminum or steel. The surface may also be constructed of a layer of steel foil over aluminum, making the surface magnetic for reasons to be explained below. Raised supporting members 16 and 18 are shown at the top and bottom of plotting surface 2. These members constitute the slides on which end members 4 and 6 of a plotting arm 24 ride. The plotting arm 24 consists of end members 4 and 6 which support the respective ends of tubular support member 14 and channeled support member 12. Pen carriage 8, supporting pen 10 and pen lift knob 32 are slidably mounted on both tube 14 and channel 12 for free movement therealong. Reference numerals 20 and 22 denote the sides of a trough structure 28 and 30. This trough structure provides a support and guide for electrical cables 5. These cables supply power and control information for positioning the arm and pen. Spring 26 is inserted between one of end pieces 4 or 6, and slides 16 or 18, respectively, to assure that arm blocks 4 and 6 are held in contact with guides 16 and 18 to provide proper guidance to arm. This eliminates the need for close manufacturing tolerances.

In operation, plotting arm 24 is first caused to move to its extreme left or right position in FIG. 1. Appropriate size paper is then affixed to plotting surface 2. In practice, the paper is held to the surface by magnetic members which coact with the magnetic material of the plotting surface. Of course, other means may be provided for holding the paper in the plotting surface as desired. Then, under control of the electronic circuitry and mechanical drive means to be described later, the arm and pen are caused to move across the paper.

FIG. 2 is an end view of the plotter shown in FIG. 1. Like numerals denote like parts throughout the drawings. In this view, trough 28 has been omitted for clarity.

One of the principal features of the present invention resides in the unique double drive mechanism, one side of which is shown in FIG. 2. This drive mechanism consists of drive sprocket 38, idler sprocket 36 and bead belt 40. Sprockets 36, 38 are so constructed in relationship to the size of the beads constituting the belt 40 that accurate alignment at both sides of the plotter without slippage is accomplished. Numeral 34 denotes a servo motor which drive pen carriage 8 along plotter arm 24, as will be further described below.

FIG. 2A is a detailed view of the connection between bead belt 40 and supporting block 4. The same connecting structure is uitilized for the supporting block 6. The bead belt 40 is connected to block 4 via hooks 50 and 52. Block 4 is cut so as to produce leg members 46 and 56 and spaces 44 and 60 located behind the leg members. Each of leg members 46 and 56 has apertures 48 and 54 located therein. Aperture 54 has a size large enough to permit free movement therein of the hook 52. Hook 50 has no such free movement in aperture 48. In construction, hook 50 is inserted into aperture 48 and tab portion 62 is then bent into the position shown. The free movement of hook 52 in aperture 54 is restricted by tensioning spring 58. This spring abuts between the inner surface of leg 56 and tab portion 64 of hook 52. In this manner, spring 58 takes up the dimensional tolerances in the system providing proper tension on the bead belt.

FIG. 3 is an end view of the plotter of FIG. 1 in the direction of the arrow 3 in FIG. 1. FIG. 3 shows a significant feature of the present invention which enables the plotter to have a low cost while maintaining significant accuracy. This feature is the double bead belt drive off a single drive motor source. Shaft 68, located at the underside of plotting surface 2, is driven by a servomotor gear box 72 through a gear 70 having a hub 84. Gear 70 may be affixed to the shaft 68 by a set screw, not shown. Shaft 68 is connected to both the drive sprocket 38, described in FIG. 2, and a drive sprocket 86 located at the opposite side of the plotter. Support for shaft 68 is provided by members 74 and 88 which constitute parts of the structural members 77 and 77′ configured as shown in FIG. 3 which are affixed as by glue or other fastener to the underside of plotting surface 2. Hubs 80 and 82 of sprockets 86 and 38 respectively are mounted over shaft 68 to prohibit motion of the shaft along its longitudinal axis.

An electrical terminal board 78 is affixed to a portion 76 of structural member 77 to provide for electrical connections to the plotter drive mechanisms.

Notches 79 and 81 are configured as part of member 77 to provide for the mounting of a printed circuit board. As shown in FIG. 1, structural support for cable troughs 28 and 30 is provided by rods 7, 9, 11 and 13. The troughs 28 and 30 partially cover the ends 4 and 6 of the plotter arm 24 by portions 19 and 21 as shown in FIG. 3. Covering portions 19 and 21 are supported at one end of the plotter by rods 15 and 17, and by similar rods at the other end of the plotter.

Electrical cables 5 are anchored to an inner wall of troughs 28 and 30 by L shaped clamps 23 and 25.

FIG. 4 is a section view taken along the line 4—4 of FIG. 1. In FIG. 4, an idler sprocket 36 and a driven sprocket 91 of the double sided drive mechanism are shown connected to follow up potentiometer 104 and to idler mechanism 96 respectively. Sprocket 36 may be affixed to shaft 98 by either frictional engagement or by set screw 120 as shown. Shaft 110 is coupled to potentiometer 104 and is supported by bearings 108 and 118 affixed to supports 90 and 74 of member 77′, respectively.

As shown in both FIGS. 3 and 4, support 74, constructed integrally with plotting surface 2, also functions as the mechanical support for the electronics which control the plotter's motion. These electronics are all located on a single printed circuit card 112 which is anchored between self tapping screws 116 in FIG. 4, and 94 in FIG. 3, at the outermost end of support 74, and slot 114. This arrangement provides both simplicity of construction and ease of removal for servicing.

Sprocket 36 is mounted by supports 76 and 88 of member 77 for free rotation by bearings 96 and 100 located, respectively, in each support.

FIG. 5 is a top view of the plotter arm and pen carriage drive employed with the present plotter. Sprocket 124 in end housing block 4 is the driving sprocket while sprocket 122 housed in end block 6 is the idler sprocket. Precision is obtained by again using a bead belt drive similar to that used to drive the plotter arm across the plotting surface 2, and described in connection with FIGS. 2-4.

FIG. 5A shows a detailed section of the channel member 12. This member is formed so that a channel shaped space 148 which surrounds bead belt 126 on three sides is produced. The open side of the channel is oriented, in practice, facing tube member 14 but can be oriented in any position desired.

FIG. 6 shows a section view of the bead belt connection to pen carriage 8 taken along the line 6—6, of FIG. 5. This connection is similar to that described in FIG. 2A for connecting the dual bead belt drive for the plotter arm to both end blocks 4 and 6. In FIG. 6, two bead hooks 150 and 152 affixed to pen carriage 8 by different means, establish the connection. Bead hook 152 is affixed to block 8 in practice by inserting an end of the hook in a slot, not shown, and bending up portion 156 after the spring is installed. Of course, other methods of affixing the hook to the pen carriage are within the scope of the invention. At its other end, hook 150 has a forked arrangement consisting of prongs 160 and 166 separated by a space 164. End bead 168 of bead belt 126 is snapped into the position shown with its connecting link to the remainder of the belt set in space 164. Bead hook 152 has similar forked structure consisting of prongs 162 and 172 separated by space 170. End bead 174 at the opposite end of bead belt 126 is snapped into its position in a manner similar to that described in connection with bead 168.

Bead hook 152 is spring mounted in block 8 through a slot, not shown, using spring 154 in compression between end portion 158 of bead hook 152 and the inner wall of pen carriage 8. This spring mounting provides the same advantages described in connection with spring 58 in FIG. 2A.

FIG. 7 is a front view, partially in section, taken along the line 7—7 of FIG. 5. This figure shows details of the plotter arm construction. End blocks 4 and 6 are shown having snap covers 136 and 138 in place in FIG. 7. Motive power for the pen carriage 8 is supplied by a servo motor gear box 128 having a shaft 130 upon which drive sprocket 124 is mounted. Nut 132 is affixed on threaded portion 134 of a mandrel 176 to hold sprocket 124 in place. A slip clutch assembly may be affixed to shaft 130 by friction or by a set screw 178 as shown. The slip clutch permits the pulley 124 to rotate independently when excess torque is applied thereto when the carriage is moved manually. The slip clutch includes friction washers 135 and 137, a spring washer 133 to compress the friction washers, the nut 132 and mandrel 176.

Detection of pen carriage position is accomplished by potentiometer 144 connected to driven sprocket 122 via shaft 142. Potentiometer 144 is affixed to end block 6 by appropriate means such as nut 146. Sprocket 122 is attached to shaft 142 by set screw 140 although other means such as friction may be employed.

FIG. 8 is a section view of the pen carriage 8 taken along the line 8—8 of FIG. 7. This pen carriage provides a very simple and inexpensive means to lift the pen 10 from the plotting surface. In FIG. 8, pen lift knob 32 is attached to shaft 182 by set screw 180. Knob 32 rides on protrusions 184, 186 molded into the top of pen carriage 8. Shaft 182 is supported by tubular molded member 202 formed on an inner wall of carriage 8. Shaft 182 has a narrowed neck portion 199 and a flat end portion 190. Neck portion 188 fits into space 204 in main support member 196 so that the end portion 190 would make contact with some part of support 196 when shaft 190 is caused to move upwards. A compression spring 192 surrounds molded member 202 and contacts support 196 exerting a force on member 196 in a downward direction in FIG. 8. The opposite end of support 196 carries pen 10 in a suitably apertured portion 200; the details of which are not a part of this invention. Space 198 in pen carriage 8 permits free movement up and down of portion 200. In operation, knob 32 is turned causing it to ride up onto raised portions 184, 186 on carriage 8. This upward lift causes end portion 190 of shaft 182 to also move upwards. End 190 contacts some part of support 196 causing it also to move upwards and, since support 196 pivots about point 194, pen support portion 200 is forced upward.

FIG. 9 shows details of the underside configuration of pen lift knob 32. Portions 212 and 212' are flush with the inner surface of knob 32. Portions 210 and 210' are raised a desired distance from the inner surface while portions 206, 206' and 208, 208' are raised a still higher distance from the inner surface of knob 32. When the pen is down, raised portions 184 and 186 on the top of pen carriage 8 are located in the area of portions 212 and 212' but do not contact those portions providing free motion of the knob eliminating the need for maintenance of close manufacturing tolerances between the bottom surface of the pen lift knob and the top surface of pen carriage 8. When the pen is up, raised portions 184 and 186 are contiguous with portions 210 and 210'. Positive engagement in portions 210, 210' is provided by portions 206, 206' and 208, 208' which prohibit the knob and thereby the pen 10 from slipping out of their raised positions.

Figure 10:
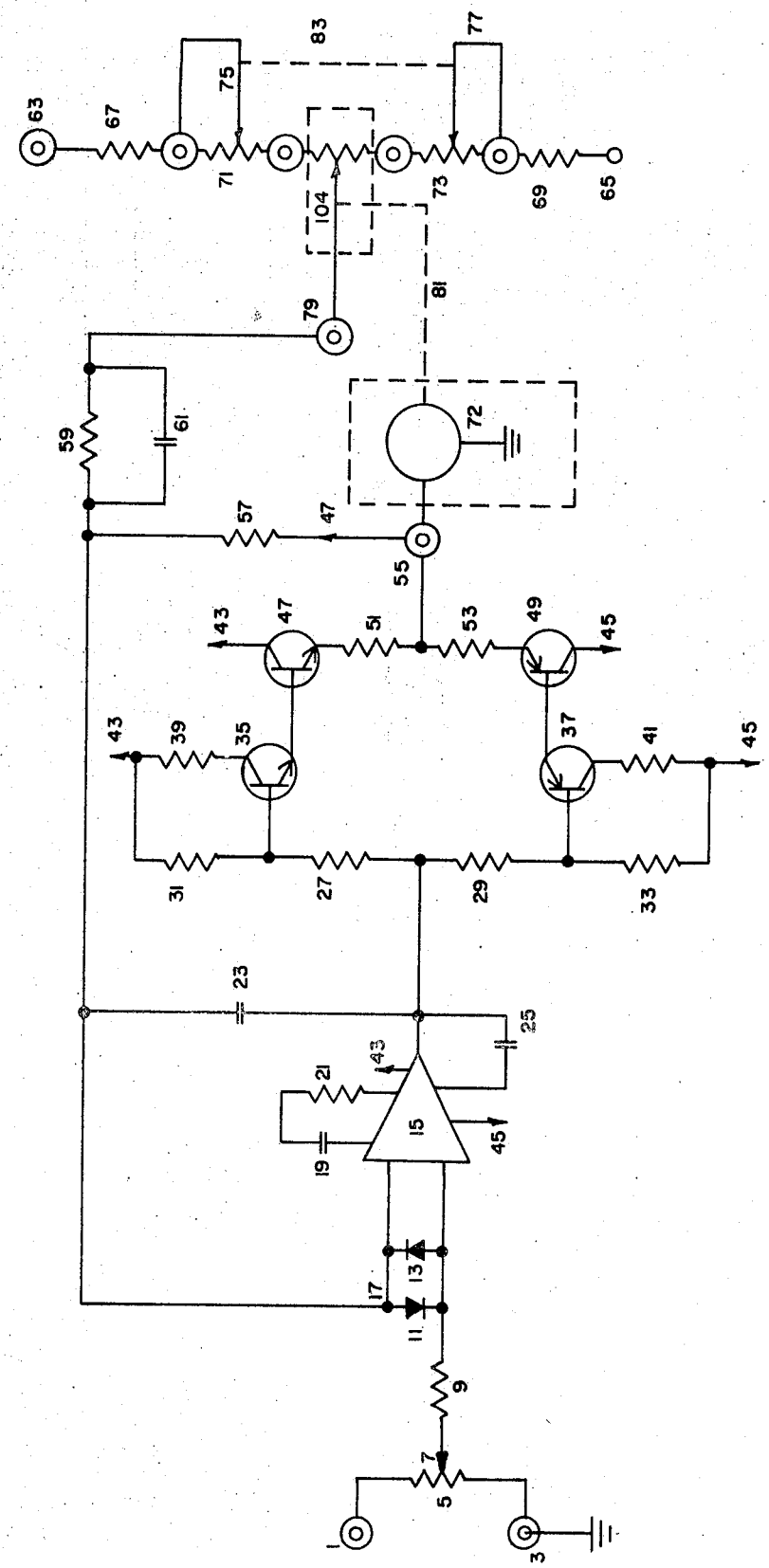
FIG. 10 is a schematic of the electrical control circuitry employed with the invention.

FIG. 10 is a schematic diagram of the electrical circuitry used to drive the plotter arm and the pen carriage. Only the arm drive circuitry is shown, it being understood that the pen drive circuitry is precisely the same as the arm circuitry. In the plotter of this invention, the X component of the input signal to be plotted is used to position the arm while the Y component of the input signal is used to position the pen.

The X component is fed to thermal 1 of potentiometer 5. The other terminal 3 of the potentiometer 5 is grounded. Potentiometer 5 has wiper arm 7 which connects the output to the input of operational amplifier 15 via fixed resistance 9. Operational amplifier 15 is a standard manufactured component of the Fairchild Corporation and designated by them as Model 709. Diodes 11 and 13 are current limiters and serve to protect the amplifier from large voltage inputs. Resistor 21 and capacitors 19, 23 and 25 constitute the frequency response determining elements for amplifier 15. The values of resistor 21 and capacitor 19 in practice, follow the manufacturer's recommendations for these components. The output of amplifier 15 is fed to two balanced servo motor drive amplifiers consisting of transistors 35 and 47 for positive inputs and transistors 37 and 49 for negative inputs. Resistors 27 and 29 constitute impedance matching resistors for the connection between the output of amplifier 15 and the inputs at the bases of transistors 35 and 37. Bias for each of transistors 35 and 37 is provided by resistors 31 and 33, respectively. Transistors 35 and 37 constitute a standard emitter follower circuit. Resistors 39 and 41 are the current limiting resistors for each transistor. Reference numerals 43 and 45 denote equal positive and negative voltage sources for each amplifier. The outputs of transistors 35 and 37 are connected to the bases of transistors 47 and 49, respectively. Stabilizing output resistors 51 and 53 are coupled to the emitters of transistors 47 and 49 to ensure a balanced output. Depending on the polarity of the output of amplifier 15, either transistor 35 or transistor 37 will turn ON providing an output signal at point 55 of a polarity to drive arm motor 72 in either of two opposite directions. Motor 72 drives the arm across the plotting surface 2 to a position determined by the magnitude and polarity of the signal at point 55. This position is continuously read by follow up or detector potentiometer 104 which is linked to the arm via the bead belt drive. This mechanical connection between motor 72 and potentiometer 104 is denoted by mechanical connection 81 in FIG. 10.

Accurate arm positioning is determined by feedback of the follow-up potentiometer 104 output to the input of amplifier 15. The position of potentiometer 104 is detected by arm 79 and is connected to terminal 17 via a network consisting of resistor 59 and stabilizing capacitor 61. Resistors 9, 57 and 59 determine the gain of amplifier 15. In practice, resistors 9 and 59 are equal so that the value of resistor 57 determines the gain of the amplifier 15 in a manner well known in the operational amplifier art. The gain of amplifier 15 is, thus, approximately equal to the ratio of the value of resistor 57 to the value of resistor 59. Amplifier 15 functions as a comparator amplifier to compare the X input representing desired arm position with the actual arm position represented by the output of follow-up potentiometer 104.

A zero adjust network is provided by reference voltage sources 63, 65, fixed voltage dropping resistors 67, 69 and potentiometers 71, 73. This network enables the operator to accurately position the arm for different paper sizes, etc. before the actual plotting begins. Potentiometer arms 75 and 77 are ganged via mechanical connection 83 so that complementary offset is obtained in both potentiometers. When the arm of either potentiometer is offset to increase the voltage applied to follow-up potentiometer, the other potentiometer moves to decrease the applied voltage, thereby producing an output signal at arm 79 of potentiometer 104 which signal, via amplifier 15, causes motor 72 to change the position of the arm.

We claim:
1. A plotting mechanism comprising:
a rigid plotting surface having at least two sides at opposite locations thereof,
guide and support means formed integrally with said plotting surface at both sides thereof,
an arm including a hollow tubular supporting means and a hollow rectangular channeled supporting means mounted for travel across said surface,
two arm blocks connected to both ends of said arm and slidably mounted on said guide and support means,
an arm drive motor and means to detect arm position mounted on said guide and support means,
a first bead belt drive mechanism connected between said motor, said arm, and said detection means at both sides of said surface to position said arm and, correspondingly, said detector means,
tensioning means for said first bead belt drive connected to said first bead belt and each of said arm blocks,
marking means mounted on said arm for travel therealong,
a marking means drive motor and means to detect the position of said marking means along said arm mounted respectively in said arm blocks,
a second bead belt drive mechanism connected between said marking means, said marking means drive motor and said marking means position detector,
said second bead belt being fully enclosed in said tubular means and partially enclosed in said channel means,
tensioning means for said second bead belt drive connected between said second bead belt and said marking means; and
an electrical circuit connected to said both arm motor and detector means and said marking means motor and detector means to position said arm across said surface and said marking means along said arm in response to desired position information wherein said marking means comprises a housing mounted on said tubular means and said channeled means,
a movable member affixed to said housing having a marking instrument secured thereto,
movable means coupled to said movable member and to said housing having a compression spring therebetween,
a knob in contact with said housing and connected to said movable means,
said knob and said housing having a complementary cam configuration whereby movement of said knob causes movement of said marking instrument via said compression spring as a function of the said cam configuration.

References Cited

UNITED STATES PATENTS

| 1,402,961 | 1/1922 | Ratcliff | 33—27(D) |
| 1,407,736 | 2/1922 | Deputy | 33—32(F) |
| 2,936,207 | 5/1960 | Beaumont et al. | 346—29 |
| 3,068,575 | 12/1962 | Fenske et al. | 33—1(M) |
| 3,091,030 | 5/1963 | Zumbrunnen | 74—231(C) |
| 3,193,943 | 7/1965 | Moore | 33—80X |

HARRY N. HAROIAN, Primary Examiner

U.S. Cl. X.R.

33—1